United States Patent Office 2,846,331
Patented Aug. 5, 1958

2,846,331

PROCESS OF DISPERSING SOLIDS IN CAPROLACTAM

Forrest J. Rahl, Morristown, N. J., assignor to Allied Chemical Corporation, New York, N. Y., a corporation of New York No Drawing. Application July 20, 1955
Serial No. 523,363

5 Claims. (Cl. 106—308)

This invention relates to a process of making a dispersion of finely divided solid in epsilon-caprolactam, which dispersion is substantially free of agglomerates of particles.

Dispersions of finely divided solids in oils and the like at relatively high solids content, such as 5%–95% by weight, are broadly known, and have been used for many purposes, e. g. for incorporation in paints, lacquers, varnishes or inks as pigments or fillers; to provide a white pigment or filler for rubber goods; to provide an opacifier for paper; to provide an opacifier for plastics; in processing leather; etc.

When finely divided solids are dispersed in a liquid, especially when the dispersion is a relatively high concentration of solids, difficulties are encountered due to agglomeration of the solids; that is, the particles of solid tend to adhere together in a more or less loose mass. This behavior is due to a complicated combination of factors including surface tension of the continuous medium in which the solids are dispersed, wetting power of the medium for the solids, wetting power of the medium as against wetting power of liquid impurities which may be present therein, etc.

Epsilon-caprolactam is a very effective dispersing medium for finely divided solids, at temperatures above its fusion point, which can be lowered by presence of a soluble impurity such as water, etc., if desired. Both hydrophilic and hydrophobic finely divided solids of small particle sizes, such as 0.5 micron average diameter and less can be dispersed in caprolactam in accordance with my invention. Moreover, caprolactam is itself compatible with a very wide range of other liquids so that a dispersion of relatively high solids concentration in caprolactam can be used very generally as a master mix for incorporating the finely divided solid as a dispersion in a body of material. The finished caprolactam dispersions, especially those of higher viscosities, can be used as master mixes not only in liquid form above their fusion points, but also can be cooled quickly, e. g. by pouring out into a cold non-solvent or onto a cold surface, and used in solidified form, e. g. in flake, pellet or especially in powder form; and especially under conditions of quick heating up and liquefying or quick dissolving in the main body to which the master mix is added.

More particularly, my invention relates to the production of dispersions of finely divided solid in caprolactam, containing above 5% by weight, e. g. about 15% by weight or more, of finely divided solid having substantially no particles of diameter greater than about 5 microns; and having substantially no particle agglomerates exceeding in diameter the maximum diameter of individual particles of the finely divided solid. Specifically, in accordance with my invention caprolactam dispersions can be produced containing finely divided solids of average particle diameters no greater than about 1 micron, e. g. in the range of 0.1–0.5 micron, which dispersions contain substantially no particles or agglomerates of particles with diameters greater than about 5 microns.

The process of preparing these high solid dispersions in caprolactam, free of agglomerates, generally requires special operations. I have found that an effective process involves subjecting a mixture comprising epsilon-caprolactam and finely divided solid to shearing forces at concentrations of the solid and at temperatures at which the mixture moves by viscous flow under the shearing forces, and thereafter increasing the temperature at least to a point where the viscosity of the mixture is appreciably reduced. Suitable temperatures for the shearing operation are from the point at which the caprolactam fuses, up to say about 80° C. The fusion point of the caprolactam will depend upon its content of impurities, such as water, etc., and may be below room temperature. The viscosity is also dependent upon the content of impurities and upon the concentration of solids in the mixture. Accordingly, the temperature for the shearing step must be judged with reference to the viscosity of the mixture being handled.

The proper viscosity conditions are dependent, at least to some extent, upon the apparatus used to apply shearing forces to the mixture under treatment. One suitable type of apparatus is the Baker-Perkins sigma blade mill, in which two blades are mounted, spaced apart each on its own axle, horizontally and at close clearance above the bottom of the mixing vessel. The blades rotate in opposite directions at different rates of speed so that the tips of the blades periodically come close together and then move farther and farther apart. The mass being treated is thereby subjected to a shearing action across the bottom of the mixing vessel and a pulling force between the blades.

The viscosity of my mixtures should be such that they are thoroughly worked and pulled out between the blades. When the mixture is too viscous it balls up on the blades in a doughy mass mostly above the blades. When the mixture is too thin for the shearing operation it is mostly stirred rather than being pulled between the two blades.

The shearing action above described is not usually sufficient in itself, I have found, to produce a dispersion of solid in caprolactam substantially free of agglomerates. I produce such a dispersion, in accordance with my invention, by the additional step of heating the mixture to a point where the mixture becomes relatively thin. Usually the shearing operation is continued for most of the working time, and the heating operation must be carried out at least twice to obtain a good dispersion. A suitable schedule is 55 minutes shearing at about 65–75° C. and 5 minutes heating at about 90–100° C.

The mechanism of the shearing action is probably to break up agglomerates by pulling the particles apart both through the shearing effect of the viscous flow and through the shearing effect of agglomerates rubbing across each other. The mechanism of the heating up operation is not entirely understood, but probably involves, at least in part, replacement of impurities having relatively high surface tension and adhering to the solid particles by caprolactam, these impurities being probably dissolved into the main body of caprolactam dispersing medium.

Among the solids which can be dispersed in caprolactam in accordance with my invention are delusterants and pigments. These dispersions are available for use as master mixes for delustering or pigmenting melt spun filaments. Caprolactam is compatible with molten filament-forming materials such as polyamides, and is not adversely affected by the high temperatures required for melt spinning. In the dispersions employed to deluster or pigment filaments from the melt, the requirements as to freedom from agglomerates are especially rigid since the final dispersions prepared by adding the master mix to the melt must be capable of passing through fine filters and fine spinneret holes.

In the examples below my invention is illustrated with reference to titanium dioxide and zinc sulfide, which are common delustering agents and pigments for use in filaments. Use of an organic solid is illustrated by the example below employing aluminum adipate. A wide variety of other solids can be similarly dispersed in epsilon-caprolactam, and the invention is not to be considered as limited to the details of the examples.

EXAMPLE 1

*Production of 50% $TiO_2$-lactam dispersion*

1500 grams caprolactam heated to 85–90° C. in Baker-Perkins mill; 1500 grams Titanox AMO grade (hydrophobic pigment grade titanium dioxide of anatase crystal structure) then added; 4-hour grind consisting of 4 cycles of 55-minute grinding and 5-minute wetting (heating) periods. The mill was operated at a speed of approximately 55 R. P. M. The temperature of the grinding periods as measured near outside edge of the mix was 68–70° C. and during the heating periods the temperature was raised to 100° C. Examination of a sample under the microscope showed substantial absence of particles larger than 1 micron. (The Titanox has an average particle size, mean diameter, of 0.3 micron.)

*Production of 0.3% $TiO_2$ polymer dispersion*

The lactam dispersion, at a temperature of about 100° C., was fed into the polymer reactor when the reactor charge had reached a temperature of 255° C.

Data for the polymerization operation:

200 lbs. lactam
2 lbs. phosphoric acid (100%)
2 lbs. water

Heating cycle for stirred polymerizer:

Heated from 90° C. to 201° C.; 1 hr. 55 min.
Maintained at 203° C. for 20 min. with air condenser
Heated from 203° C. to 255° C. with steam condenser; 3 hrs. 10 min.
($TiO_2$-lactam dispersion added)
Maintained at 255–257° C. for 6 hrs.

EXAMPLE 2

*Production of 30% $TiO_2$-lactam dispersion*

1750 grams caprolactam
750 grams Titanox AMO grade

Otherwise same as Example 1.

*Production of 0.3% $TiO_2$ polymer dispersion*

Heating cycle for stirred polymerizer:

Heated from 90° C. to 199° C.; 1 hr. 15 min.
Heated 199° C. to 208° C. with air condenser; 20 min.
Heated 208° C. to 255° C. with stream condenser; 2 hrs. 55 min.
($TiO_2$-lactam dispersion added)
Maintained at 255° C. for 6 hrs.

EXAMPLE 3

*Production of 39.3% $Al_2Ad_3$ (aluminum adipate) lactam dispersion*

1700 grams of caprolactam were heated to 85–90° C. in Baker-Perkins mill; 1100 grams aluminum adipate (pulverized in commercial machinery) then added; 4-hour grind consisting of 4 cycles of 55-minute grinding and 5-minute wetting (heating) periods. The mill was operated at a speed of approximately 55 R. P. M. The temperature of the grinding periods near outside edge of the mix was 68–70° C. and during the heating periods the temperature was raised to 100° C. No agglomerates noted. Particle sizes were those as reported by pulverizing machine company, i. e. some particles as large as 8 microns with an overall average of 1–2 microns.

Enough of this master mix was added at 90° C. at the beginning of a polymerization run to the reactor charged at 90° C. to incorporate 1.15% $Al_2Ad_3$ in polymer with stirring.

EXAMPLE 4

*Production of 30/70 ZnS/lactam dispersion*

1750 grams lactam were heated to 85–90° C. in Baker-Perkins mill; 750 grams ZnS (finely divided quality supplied by N. J. Zinc Co.) then added; 5-hour grind consisting of 5 cycles of 55-minute grinding and 5-minute wetting (heating) periods. The mill was operated at a speed of approximately 55 R. P. M. The temperature of the grinding periods near outside of the mix was 68–70° C. and during the heating periods the temperature was raised to 100° C. No agglomerates were noted.

Enough of the above master mix was added at 100° C. to a polymerization run after it was on temperature 2 hours (at about 255° C.) to incorporate 0.35% ZnS in polymer (stirred).

The polycaprolactam products of all the above examples were satisfactory for melt spinning into delustered yarn.

Dispersions have been made successfully in accordance with the above outlined procedures using a hydrophilic grade of titanium dioxide instead of the hydrophobic grade used in Examples 1 and 2 above.

I have found that with too low solids content in the caprolactam dispersing medium, the viscosity of the mixture is too low, even at the fusion point, to permit the desired viscous flow in the apparatus above described. Accordingly, I prefer to use in my process dispersions having at least about 15% by weight solid concentration, preferably about 25% by weight. When the solid concentration is too high the material may be difficult to handle for pouring into a large body of material when used as a master mix. Moreover, if a master mix of very high solids is poured into a liquid at relatively high temperature, such as a fused polyamide at 200° C. and above, caprolactam may be vaporized to the extent that agglomerates are reformed. Accordingly, I prefer a maximum of about 75% solids, and more particularly about 50% solids. An excellent range of solids content for most purposes is 30–40%.

I have observed that as temperatures are elevated above the fusion point of the mix, the mix will first be very pasty (at sufficient solids content, say 25% or more); then will be doughy as desired for the "grinding" or shearing operation; then will be like whipped cream or heavy paint as desired for the "wetting" or heating operation; then will become progressively more fluid and easily poured and stirred as desired for mixing into a larger liquid body, e. g. polycaprolactam in the melt.

This fluid stage is succeeded, at least when titanium dioxide is the dispersed solid, at about 125° C. and up by a stage of irreversible thickening. This thickening may be due to polymerization of the caprolactam dispersing medium under the influence of titanium dioxide. Accordingly in the heating up operation upon my dispersions I prefer to limit the temperature to about 125° C. as a maximum.

As noted above, the caprolactam used as dispersing medium can contain diluents, freezing point depressants, etc., if desired. Pure caprolactam can also be used. Certain impurities such as water may have a flocculating effect on finely divided solids, causing formation of agglomerates. Accordingly I generally prefer to use at least about 85% pure caprolactam, especially 95% pure or better, as the continuous phase in which solids are dispersed.

I claim:

1. A process of dispersing about 5%–95% by weight of finely divided solid of the group consisting of delusterants and pigments in epsilon-caprolactam which process comprises subjecting a mixture of epsilon-caprolactam and about 5%–95% by weight of finely divided solid to shearing forces at concentrations of the solid and at temperatures such that the mixture flows as a viscous liquid of doughy consistency, sufficiently fluid that it does not ball up while being subjected to said shearing forces and thick enough to be pulled out under said shearing forces by viscous flow rather than being stirred, said mixture being appreciably more viscous than caprolactam per se at the same temperature and thereafter increasing the temperature to a maximum limit of about 125° C. and at least to a point at which the viscosity of the mixture is appreciably reduced; and continuing said application of shearing forces producing said pulling out and viscous flow, interspersed with periods of increasing the temperature to a point of appreciably reduced viscosity as aforesaid, at least until a dispersion results containing substantially no particle agglomerates exceeding in diameter the maximum diameter of the individual particles of the finely divided solid.

2. A process as defined in claim 1 wherein the finely divided solid is at least one material of the group consisting of delusterants and pigments for a molten filament-forming material, and the temperature of the shearing operation is in the range between the fusing point of the epsilon-caprolactam and about 80° C., and shearing is continued for most of the working time interspersed with at least two heating periods.

3. A process as defined in claim 2 wherein the dispersed solid is titanium dioxide at concentration in the range between about 15% and about 75% and temperatures of heating up are not greater than about 125° C.

4. A process as defined in claim 3 wherein the caprolactam continuous phase is at least about 85% pure and the titanium dioxide concentration is in the range between about 25% and about 50% in the dispersion.

5. A process as defined in claim 4 wherein the caprolactam continuous phase is at least 95% pure; the titanium dioxide is a hydrophobic grade of particle size about 0.3 micron means diameter; the concentration of titanium dioxide in the dispersion is in the range between about 30% and about 40%; and the cycle of a shearing operation followed by a heating operation is performed at least four times.

References Cited in the file of this patent

UNITED STATES PATENTS

| | | |
|---|---|---|
| 2,184,539 | Wiggam | Dec. 26, 1939 |
| 2,345,353 | Graves | Mar. 28, 1944 |
| 2,457,591 | Moore | Dec. 28, 1948 |